United States Patent [19]

Blazek

[11] Patent Number: 4,459,021

[45] Date of Patent: Jul. 10, 1984

[54] MEMORY REGISTRATION SYSTEM

[75] Inventor: Henry Blazek, Brookfield, Conn.

[73] Assignee: The Perkin-Elmer Corporation, Norwalk, Conn.

[21] Appl. No.: 957,767

[22] Filed: Nov. 3, 1978

[51] Int. Cl.³ ......................... G06K 7/01; G06K 7/10; G11B 5/43

[52] U.S. Cl. ...................................... 356/71; 235/435; 356/394; 371/1

[58] Field of Search .................. 356/394, 71; 250/578, 250/556–557, 566; 340/146.3 AE, 146.3 AH, 146.1 E, 146.1 F; 235/435, 454, 470, 476

[56] References Cited

U.S. PATENT DOCUMENTS

| | | | |
|---|---|---|---|
| 3,230,350 | 1/1966 | Mendelson et al. | 235/435 |
| 3,350,545 | 10/1967 | Street | 250/557 |
| 3,781,829 | 12/1973 | Singh | 340/146.1 E |
| 4,118,730 | 10/1978 | Lemelson | 358/107 |
| 4,179,685 | 12/1979 | O'Maley | 250/556 |
| 4,197,584 | 4/1980 | Blazek | 356/394 |

OTHER PUBLICATIONS

Smith et al., "A New Algorithm for Edge Detection", Computer Graphics & Image Processing, vol. 4, 1975, pp. 55–62.

*Primary Examiner*—William H. Punter
*Attorney, Agent, or Firm*—Thomas P. Murphy; Edwin T. Grimes; Francis L. Masselle

[57] ABSTRACT

A registration system for use with a document inspection system wherein a test document is compared with a master document stored in a computer memory in which the registration system has means for aligning each point on the test document with its corresponding point of the stored master document. The document inspection system optically scans each point on the test document and provides real time input to a flaw detector. The registration system optically scans the leading corners of the test document and generates addresses to read out from memory each point on the master document in precise registration with its corresponding point on the test document corrected for misalignment of the test document relative to the stored master document.

21 Claims, 5 Drawing Figures

MEMORY REGISTRATION SYSTEM

BACKGROUND OF THE INVENTION

Businesses and governments which provide the public specialized documents such as bank checks and drafts, traveler checks and currency expend substantial effort to assure that such documents meet certain quality standards. For example, for various reasons such as aesthetics, guaranty of authenticity of origin and genuineness of the document it is highly desirable for government agencies and businesses producing such documents to prevent the issuance of imperfect or flawed documents.

To insure the production of unflawed documents manufacturers employ highly sophisticated printing techniques in the production of the documents. Also for security reasons most of these documents are printed with highly complex patterns using various types of inks and papers. However, even with the use of the most modern of printing equipment documents are occasionally produced that are flawed or imperfect and in general fail to meet predetermined quality standards.

Therefore, some form of quality inspection is employed by manufacturers to insure that flawed documents are detected to prevent their issuance to the public.

Until recently, all such inspection was done visually by human operators. As is obvious, visual inspection is slow, costly and prone to human error.

Lately, due to advancements in the state of the art, the inspection process has been automated.

Using optical scanning techniques, a test document may be compared with a master document stored in a computer memory to determine whether the test document meets the predetermined standards represented by the stored master.

The inspection is accomplished by means of a point by point comparison between the test document and the stored master document. The points on the test document are picture elements or pixels each of which is the smallest area on the document which the system is capable of resolving. The master document is stored in memory with each pixel encoded in digital form. The test document is scanned by electro-optical means which converts the pixels into coded form. Each pixel of the test note is compared to the corresponding pixel of the stored master note. If the pixels compare favorably to an extent which meet predetermined quality standards, the test document is deemed acceptable.

In such an inspection system the test document moves relative to the optical scanning means and the point by point comparison with the stored master document is made in real time. Thus, a basic requirement of such an inspection system is the registration of each pixel on the test document with its corresponding pixel of the stored master document.

A document inspection system utilizing a registration system similar to that discussed above is described in U.S. application Ser. No. 954,018, now U.S. Pat. No. 4,197,584, entitled Optical Inspection System For Printing Flaw Detection filed on Oct. 23, 1978, having the same assignee as the present application.

The present invention relates to a registration system for use with a document inspection system.

SUMMARY OF THE INVENTION

In a document inspection system which detects flaws on documents such as currency or traveler checks where checks are serially transported past a flaw detection array each check is optically scanned on a line by line basis. Real time comparison of the test check with a stored master check requires that each pixel on the test check be in precise registration with the corresponding pixel read from memory so that the comparator sees both simultaneously. If the checks were perfectly placed on the transport i.e. with no misalignment relative to the flaw detector array, and equal in size (measured in pixels) to the master check, registration would be a simple matter of timing i.e. the first and subsequent scan lines of the master check could be brought out of memory in synchronism with the scanning of the test check under control of a scan line counter. In practice, such ideal alignment is seldom the case since it's virtually impossible to align the test checks perfectly on the transport. Additionally, not all test checks are equal in size. This causes variations in the separation of corresponding pixels at the extremes of the line scan. For example, if the check is larger by 1% then corresponding pixels which are nominally 100 pixels apart would be found to be 101 pixels apart.

The present invention contemplates a memory registration for use with a flaw detection system which automatically corrects for these problems and provides a registration technique wherein the scan lines in memory and from the test check are segmented and the segments are precisely aligned regardless of the orientation and size of the test checks moving past the flaw detector array.

The registration system of the present invention utilizes two registration data arrays placed in advance of the flaw detection array which scan the upper and lower corners of the test check. Logic means associated with the registration data arrays precisely align the corners of the test check with the corresponding corners of the stored master check. This provides sufficient information for further means to generate addresses to memory which cause the memory to output scan line segments in which the center pixel is precisely aligned with the center pixel in the corresponding segment of the flaw detection array.

DRAWINGS

The foregoing features as well as other features of the invention will become more apparent with the reading of the following description in conjunction with the drawings wherein.

DESCRIPTION

Figure 1:
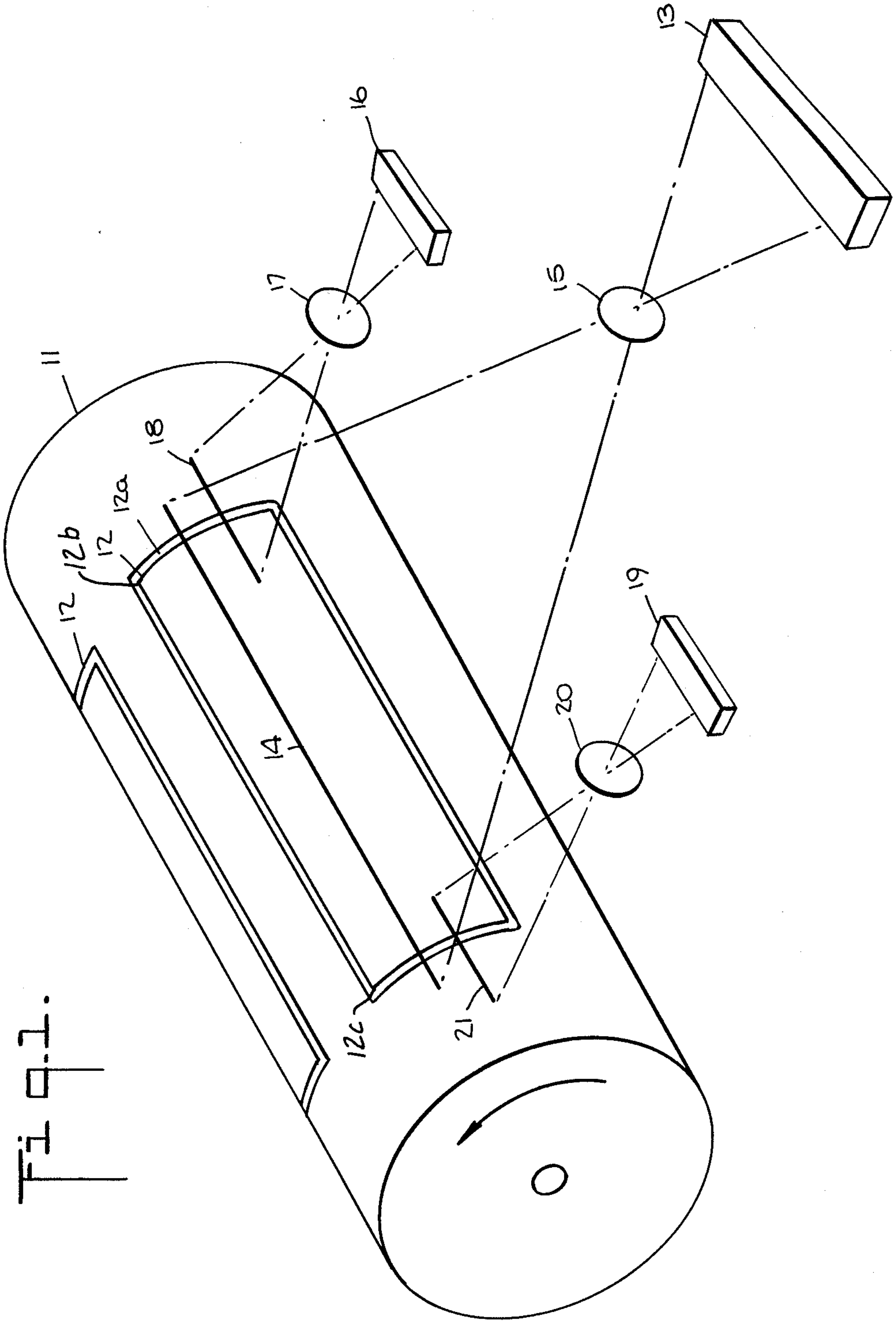
FIG. 1 is a pictorial representation of the relationship between the transported check and the flaw and registration data arrays.

Referring to FIG. 1 there is shown a drum 11. The drum 11 represents a portion of a document inspection transport system of a type used to transport a test document through a flaw detection station.

Document 12 such as a currency bill or traveler check are deposited on the drum 11 and held there by vacuum or other means. The documents or checks 12 are fed serially to the drum 11 at a constant rate and removed therefrom for further transport and/or stacking after the inspection of each check 12 is complete.

For purposes of explanation of this invention it is assumed the checks are inspected on one side only. However, it should be understood that complete inspection involves both sides of the check 12 and that the other side of the check 12 would be inspected somewhat later in the transport path.

The checks 12 are shown having borders 12*a* similar to the borders on currency or traveler checks.

A flaw detection array 13 is disposed adjacent the drum 11 for viewing the checks 12 as each passes through its field of view represented by the line 14. The flaw detection array 13 views the checks 12 through a lens 15. The field of view 14 is sufficiently long to cover the length of the check 12.

Registration arrays 16 and 19 view the check 12 through lenses 17 and 20, respectively. The registration array 16 is disposed so that its field of view 18 is positioned to view the leading right hand corner of the check 12. The registration array 19 has a field of view 21 which views the leading left hand corner of the check 12.

The registration arrays 16 and 19 are positioned so that each "sees" its respective corner somewhat in advance of the time that flaw detection array 13 "sees" the leading edge of the check. This arrangement provides sufficient time for processing the data from registration arrays 16 and 19 and initializing the flaw detection process so that registered pixels from the stored master check are available for comparison to the corresponding test note pixels as they are generated in real time.

Precise registration requires high resolution in the data used to establish registration. However, flaw detection requires relatively low resolution since patch sizes i.e. groups of pixels need only to be compatible with the sizes of the flaws which it is desired to detect. In addition, unnecessarily high resolution in the flaw data produces data rate problems in the electronics.

Thus, to satisfy the requirement for precise registration without introducing data rate problems, the system of the present invention uses relatively high resolution in the data used to established registration and relatively low resolution in the data used for flaw detection. In a practical embodiment of the present invention the proposed ratio between the pixels of the flaw detection and registration arrays is 4:1. Therefore, resolution of the lens 15 is one fourth of the resolutions of the lenses 17 and 20.

In FIG. 1 the drum 11 rotates in the counterclockwise direction such that the longer dimension of the checks 12 moves at right angles to the direction of motion and the shorter dimension is parallel to the direction of motion. As each check moves into the fields of view 18 and 21 the registration data arrays "look" at the sides of the check and generate one bit data which is used to produce a high resolution black and white image of the note sides.

Each check 12 comprises a plurality of scan lines with each scan line comprising a plurality of pixels. The number of scan lines is a function of the selected pixel sizes which has been chosen to be 0.015 mils. Assuming the short dimension of a check to be two and one half inches the total number of scan lines on a check e.g. a traveler check would be 166. Each scan line comprises 512 pixels.

Figure 4:
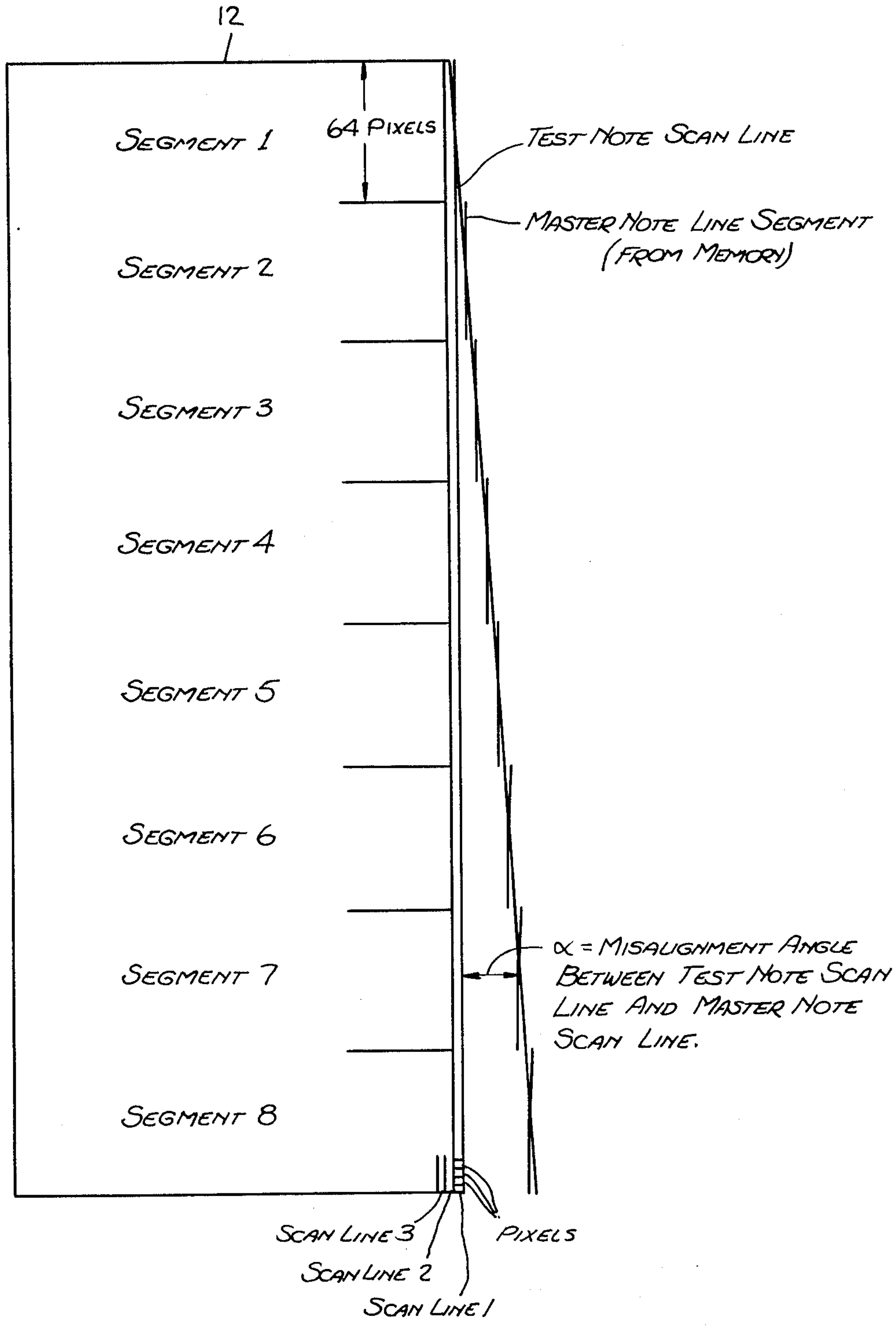
FIG. 4 is a graphical representation of the relationship between a test check scan line and the corresponding stored master check scan line.

FIG. 4 illustrates the orientation of the first three scan lines of a check 12 without attempting to show them in scale. The master check in memory is stored according to scan line and pixels within a scan line. Addressing the memory requires the scan line number and as will be seen the number of the first pixel in each of eight blocks or channels of sixty-four pixels.

As aforesaid, the flaw detection array 13 has a field of view which encompasses the length of the check 12 i.e. 512 pixels. Due to misalignment of the checks 12 on the drum 11, a field of view of 512 pixels would produce intolerably large errors. To reduce these errors to an acceptable level, the scan lines are divided into eight segments of 64 pixels each as illustrated in FIG. 4. This permits a 64 pixel segment on the test check to be registered with 64 pixels of the master check from memory. Thus, when the scan line on a test check is not parallel to the scan lines stored in memory, the stored master check line segments are obtained from portions of different line scans therein. FIG. 4 illustrates this condition in which the residual error at the ends of a line segment is equal to a maximum value of one half pixel and occurs when the angular misalignment $\alpha$ between scan lines on the master test check is $\alpha=\tan^{-1} 1/64 = 0.9$ degrees which is considered to be well within the present state-of-the-art.

FIG. 4 shows a check 12 broken down into eight segments of 64 pixels each. For $\alpha=0.9$ degrees it can be seen that scan line 1 of the test check 12 is not completely seen by the flaw detection array 13 until the first scan line in segment 8 is seen.

The present invention corrects for this problem and once registration is initiated the line segments from memory are addressed and assembled such that they are equivalent to a single scan line which is parallel to the test check scan line. In other words, the correct line segment is picked up from memory as though there were no misalignment.

Figure 2:
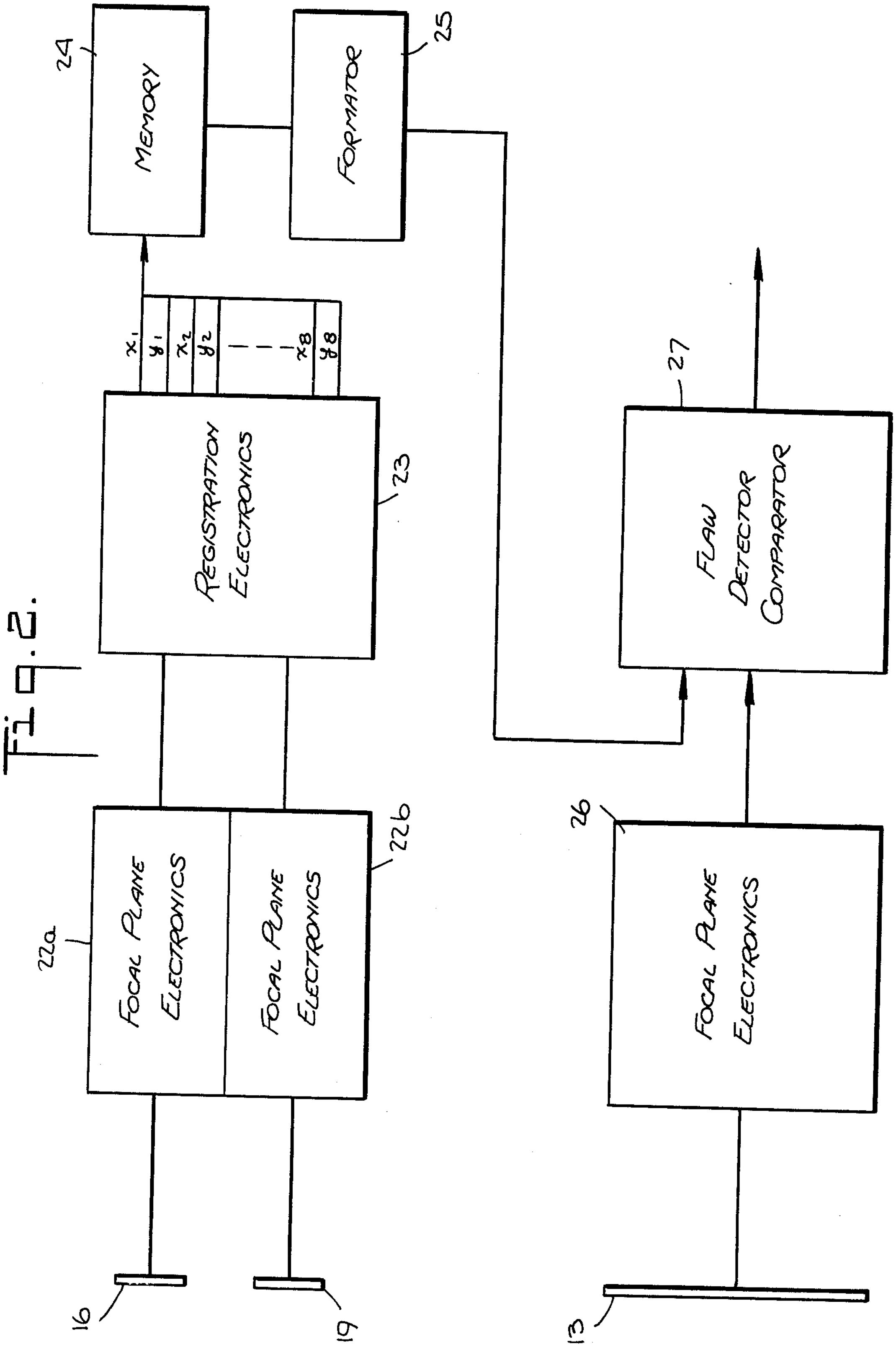
FIG. 2 is a block diagram showing the registration system in relationship to a flaw detection system.

Referring to FIG. 2 there is shown a block diagram representation of the registration system in combination with a flaw detection system.

The registration arrays 16 and 19 have their outputs connected to focal plane electronics 22*a* and 22*b*, respectively. The arrays 16 and 19 are commercially available photo diode linear detector arrays each having 256 elements. The elements are equivalent to pixels on a one to one basis. The registration array 16 and 19 provide a serial output in analog form representative of black and white areas in their field of view.

In a manner similar to that disclosed in the referenced application Ser. No. 954,018, now U.S. Pat. No. 4,197,584, the focal plane electronics 22*a* and 22*b* which are identical to each other convert the voltage output of each of the registration arrays 16 and 19 into a stream of 256 bits for each scan line. Each bit is representative of a black or white area or pixel on the viewed check. The convention of an "0" bit for black and a "1" bit for white has been selected for use in a practical embodiment of the present invention.

Thus, focal place electronics 22*a* provides a first stream of 256 bits corresponding to registration array 16 for each scan line as an input to registration electronics 23. Until the leading right hand corner 12*b* (as seen in FIG. 1) of the check 12 passes into the field of view 18, these 256 bits are all white or 1's indicative that a corner has not yet come into view. However, when the leading right hand corner 12$b$ enters the field of view 18, a portion of the 256 bits turn black or into 0's indicative that the leading right hand corner 12$b$ of the check 12 has been detected.

The leading left hand corner 12$c$ of the check 12 is detected in a similar manner via a second stream of 256 bits from focal plane electronics 22$b$ for each scan line. This stream of bits is also provided as an input to the registration electronics 23.

The registration electronics 23 along with timing information utilizes this information to determine the scan line on which each corner was seen and the pixel or bit number within the scan line on which the corner fell. The scan line counts between which each corner 12$b$ and 12$c$ was seen is a measure of the check misalignment on its transport and therefore its misalignment relative to the flaw detector array 13 as well as the stored master check.

The two input streams to the registration electronics 23 along with timing information permit the registration to generate eight sets of addresses. Each address defines the first pixel of the 64 pixel long segments of the segments 1 through 8 shown in FIG. 4 which is registered with one of the line segments being generated by the flaw detector array 13 in real time.

These sets of eight addresses $X_1Y_1$ through $X_8Y_8$ which are constantly updated as the check passes through the field of view 14 of the flaw detection array 13 are applied as address inputs to the memory 24. The memory 24 is connected to a local memory or formator 25.

The output of the formator 25 is connected as one input to a flaw detector 27.

The flaw detection array 13 has its output connected to focal plane electronics 26 which together function in a manner similar to the registration arrays 16 and 19 and focal plane electronics 22 to provide a stream of 512 bits or pixels to the flaw detection comparator 27. The 512 pixels formatted into the scan line being currently viewed by the flaw detection array 13 are compared in flaw detector comparator 27. After the check has been inspected, the flaw detector 27 makes a determination according to predetermined criteria that the comparison is favorable or unfavorable and on this basis indicates in any convenient manner that the check is acceptable or not acceptable.

Figure 3A:
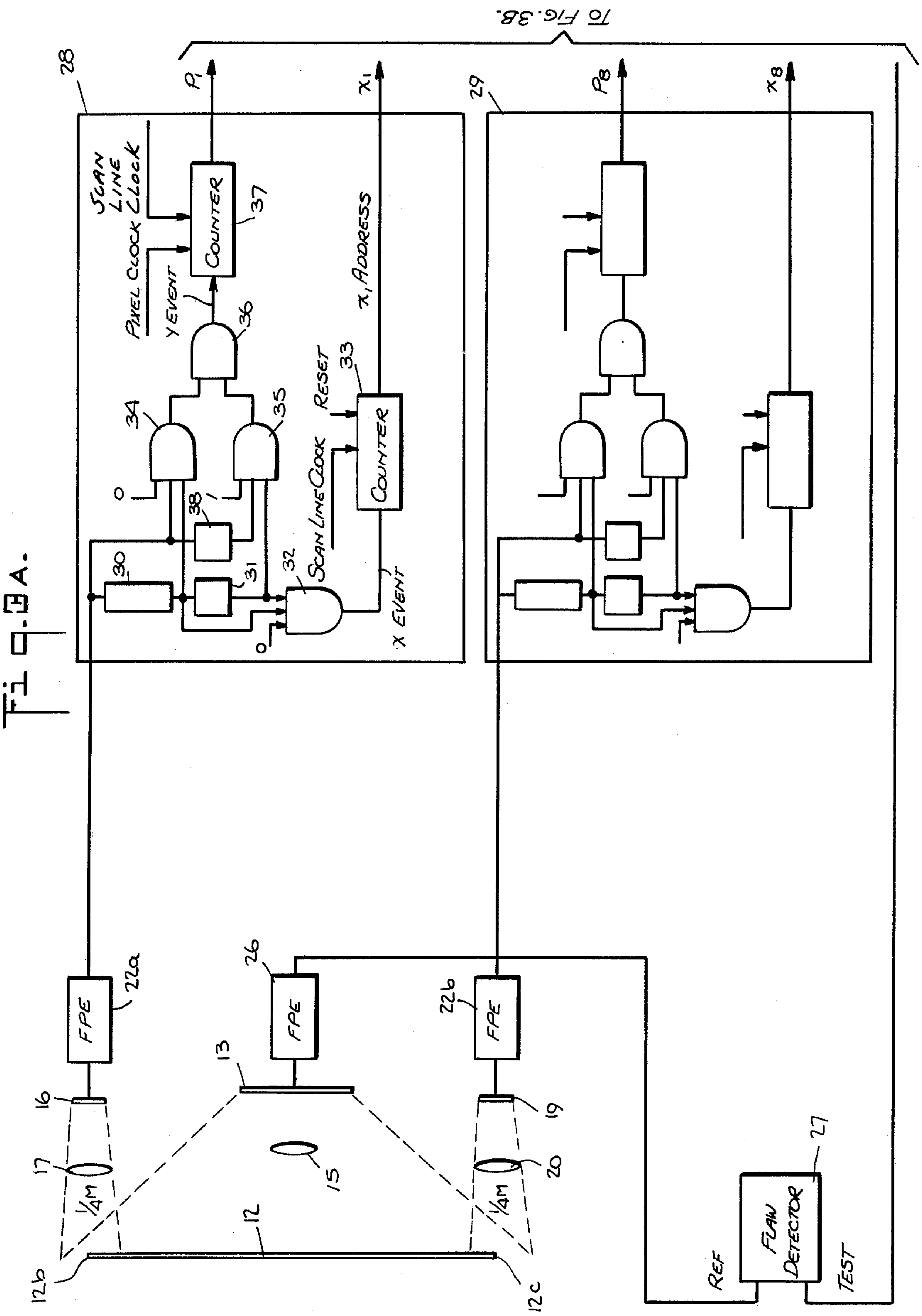
FIGS. 3A and 3B are a more detailed representation of the registration electronics of FIG. 2.
Figure 3B:
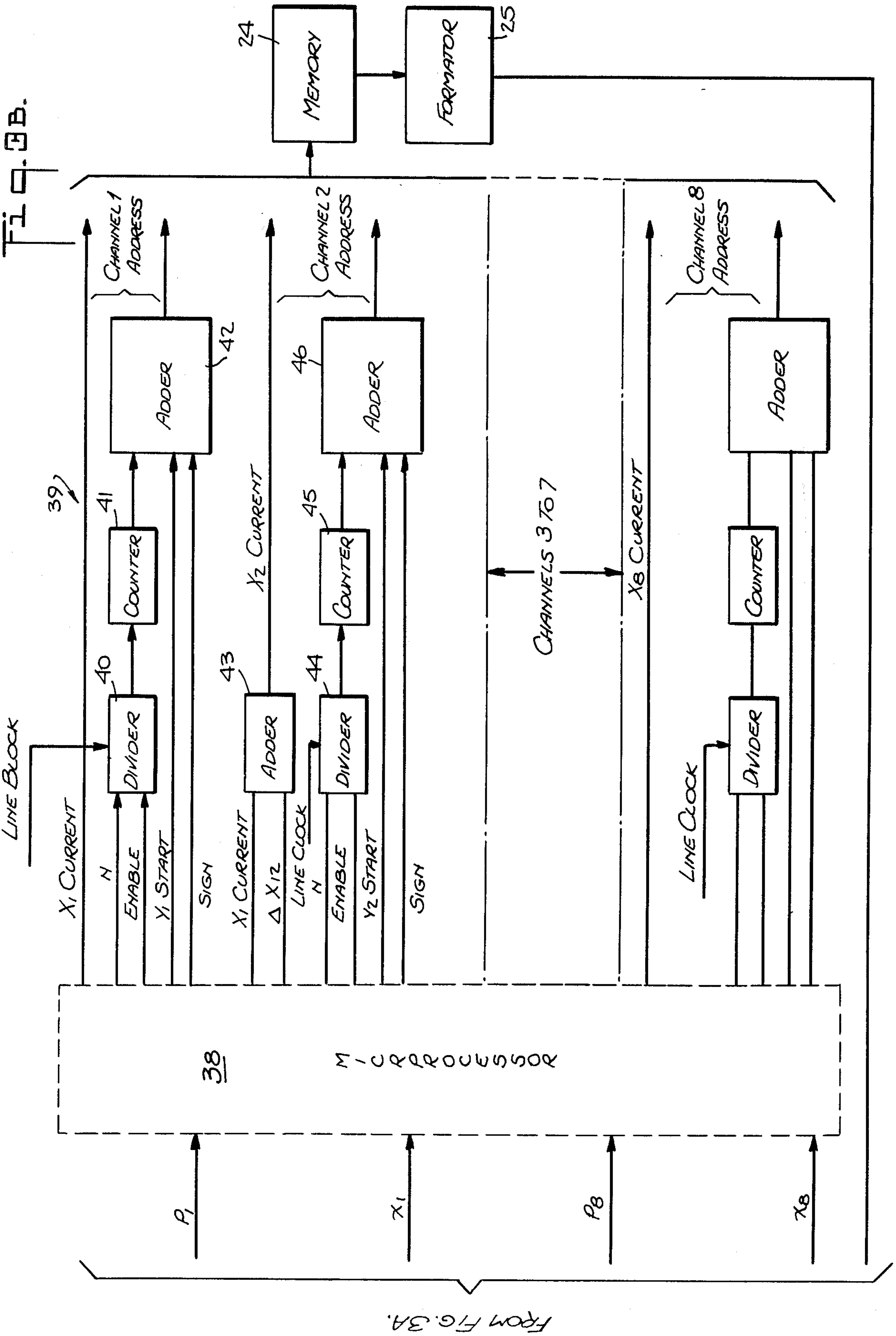

FIGS. 3A and 3B illustrate the registration electronics 23 of FIG. 2 in more detail. In FIG. 3A the focal plane electronics 22$a$ and 22$b$ are connected to right hand corner detector 28 and left hand corner detector 28, respectively.

The output of focal plane electronics 22$a$ is connected to a shift register 30 of the first in first out type. The shift register 30 is large enough to store one scan line of data which in the present case is 256 bits.

The output of the shift register 30 is connected to AND gate 32 directly and through a delay circuit 31. The delay circuit 31 provides a delay of one pixel clock period. The AND gate 32 has a third input of a constant low or "0". Thus, the AND gate 32 provides an output pulse only when it has three lows or "0" concident inputs.

The output of the AND gate 32 is connected to counter 33. The counter 33 is also connected to a scan line clock (not shown) so that when started by a pulse from the AND gate 32 it keeps track of the scan lines. The counter 33 is reset by any convenient means after each check 12 is completely scanned.

The output of focal plane electronics 22$a$ is also connected to AND gate 34 and through a one pixel delay circuit 38 to AND gate 35. The AND gate 34 receives a second input from the shift register 30 and a third input from a constant low or "0" source so that it provides an output only when it has three coincident lows or "0's" as inputs.

The AND gate 35 receives a second input from the delay circuit 31 and a third input from a constant high or "1" source so that it provides an output only when it has three coincidient highs or "1's" as inputs.

The outputs of AND gates 34 and 35 are connected as inputs to an AND gate 36 whose output is connected to a counter 37. When AND gates 34 and 35 have coincident outputs, AND gate 36 privides a stop pulse to the counter 37. The counter 37 is connected to a pixel clock and counts pixels in each scan line until it is stopped by a pulse from the AND gate 36. The counter 37 is automatically reset i.e. to start counting at the beginning of each scan line by a scan line clock (not shown).

The left corner detector 29 is identical in structure and function to right corner detector 28 and for that reason is not discussed in detail. It should be noted that depending on the misalignment orientation of a check one or the other of the corner detectors sees a corner first. The two corner detectors together provide information concerning the angle of misalignment measured in scan lines which is necessary to the generation of the addresses. The number of scan lines between the detection of the first and second scan lines is equivalent to the angle of misalignment.

Referring to the operation of the right corner detector 28 an X event is defined as the detection of a vertical border or leading edge of a check and a Y event is defined as the detection of a horizontal border of the check. Borders here mean that portion of the check where printing begins i.e. that portion of the check 12 after the border 12$a$.

As may be seen more readily later in this description two contiguous black pixels or "0'" in the stream of the pixels from registration data array 16 signify an X event and two contiguous white pixels or "1's" followed by two contiguous black pixels signify a Y event. The two events define a corner.

The AND gate 32 is gated when two black pixels occur contiguously on a scan line. When a first black pixel followed by a second black pixel is provided at the output of the shift register 30, the one pixel delay circuit 31 causes both to be input simultaneously to AND gate 32. This causes AND gate 32 to have an output which signifies an X event or that a vertical border has been detected. This output enables counter 33 to count scan lines from the scan line clock. The counter 33 may have an initial condition or count representative of the fixed distance between the registration and flaw detection arrays 16 and 13, respectfully. The counter 33 keeps track of check position in direction of motion in units of scan line periods.

Two contiguous black pixels cause AND gate 34 to provide a first input to AND gate 36. Two contiguous white pixels cause AND gate 35 to provide a second input to AND gate 36. When two contiguous white pixels are followed by two contiguous black pixels, a Y event i.e. detection of the horizontal border, has occurred. Due to one pixel delay circuits 31 and 38 both AND gates 34 and 36 are gated simultaneously and the first and second inputs to AND gate 36 occur in coincidence causing AND gate to provide a stop pulse to counter 37. The counter 37 which is restarted at the beginning of each scan line by the scan line clock is indicative of a Y event. Thus, the output of the counter 37 when stopped is the pixel number $P_1$ of the detected corner.

Corner detector 29 functions in a manner identical to corner detector 28 and provides the scan line number $X_8$ and pixel number $P_8$ when the left hand corner 12c was first seen. One or other of the corners 12b or 12c is seen first and depending on which is seen first sign information necessary for the calculation of the addresses is provided. Also the difference in time measured in scan lines between detection of corners is a measure of the misalignment and this information is needed for the running calculation of the eight segment addresses.

The outputs $P_1$, $P_2$, $X_1$, and $X_8$ are provided as inputs to a microprocessor 38 shown in FIG. 3B.

The starting y address i.e. the address for segment or channel 1, is computed by the microprocessor 38 using the following algorithm $$Y_{sn}=(y_1-P_1+1)+64\ (N-1)+1/7\ (y-P)(N-1)$$

where $Y_{sn}$=address of the first pixel in channel N of memory $y_1$=y address of right hand corner in memory $y_2$=y address of left hand corner in memory $\Delta_2=y_2-y_1$ $P_1$=pixel number of right hand corner on flaw detection array $P_2$=pixel number of left hand corner of flaw detection array $P=P_2-P_1$ N=channel or segment number in memory corresponding to channel or segment no. on check.

Once the starting x and y addresses are known i.e. once the scan line and starting pixel number of the first segment or channel is known, the address updating logic 39 generates eight addresses for each scan line seen by the flaw data array 13 to read the corresponding scan lines from memory for real time comparison of the test check and the stored check as though the check were perfectly aligned on its transport in relation to the stored check.

Referring now to the details of the updating logic 39 there is shown eight address updating channels one for each segment or channel shown on the test check in FIG. 4 and the corresponding channel of the master check stored in memory 24.

Channel 1 comprises a divider circuit 40 having an output connected to a counter 41. The output of counter 41 is connected as one input of an adder circuit 42. The adder circuit 42 receives as a second input the starting y address $y_1$ from the microprocessor 38. Adder circuit 42 also receives a sign input from the microprocessor 38 indicative of the misalignment orientation of the test check i.e. whether the right and or left hand corner was the first to be detected.

The divider circuit 40 also is connected to the scan line clock. The divider circuit 40 receives an enable input from the microprocessor 38 which for the first channel occurs when the vertical border or leading edge of the test check is seen by the flaw detection array 13.

In addition the divider circuit 40 receives an input labeled N which is the quantity $$7\times 64/x_8-x_1$$

This quantity is a measure of the angle of skew of the test check 12. The 7×64 is the number of pixels in a scan line measured from the midpoint of segment 1 to the midpoint of segment 8 as seen in FIG. 4. The $x_8-x_1$ is the number of scan line between the detection of one corner and the detection of the second corner.

The divider 40 divides the scan lines by the quantity N and provides an output to increment counter 41 by one each time the quantity N equals the scan line count i.e. each time N can be wholly divided into the scan line. This quantity is added to the y starting address $y_1$ update the y address. For example, for the situation where $x_8-x_1$ equals 7 the y address would be updated by one pixel i.e. added or subtracted to $y_1$ depending on the sign or the direction of skew for every sixty-four scan lines.

The x address for channel 1 i.e. $x_1$ is always current and is obtained directly from counter 33 of the right hand corner detector 28.

Similarly, the x address for channel 8 i.e. $x_8$ is always current and is obtained from the counter in left hand corner detector 29 which is equivalent to counter 33.

The x addresses of channels 2–7 are updated in accordance with the equation $x_N=x_1=N-1(x_8-x_1)$ Taking channel 2, for example, $x_1$ is connected as an input to an ADDER 43. ADDER 43 also has an input $x_{12}$. Assuming again the quantity $x_8-x_1=7$ and since N=2 for channel 2, and plugging into the equation above i.e. it may be seen that the address $x_2$ would be $x_1+1$ i.e. $x_1$ with one pixel added.

For channels 3 through 7 the same process is carried out with N i.e. channel number being the only variable.

The updating of the y address for channel 2 is preformed in a manner identical to that for channel 1. The only difference being in the quantities involved. Each y address updating channel solves the equation:

$$y_n=y_{sn}+(x_8-x_1)/(7\times 64)\ N_{1n}$$

where $y_{sn}$=starting y address $N_{1n}$=line scan count of the particular channel The channel 8 y address updating circuit has a divider 44, a counter 45 and an adder 46 connected in the manner of their channel 1 counterparts. The adder 46 has a sign input and a y start address input obtained from the microprocessor 38. This y start address input differs somewhat from the y start address of channel 1 due to the variables in the equation for $y_{sn}$.

The divider also has an enable input which differs in time from the enable of channel 1 due to skew i.e. the time when segment 2 of the check is seen by the flaw detector array 13.

Thus, adder 46 adds the correct number of pixels to the starting y address to obtain a current or running y address for channel 2.

The y address updating of channels 3 to 8 function in a similar manner to that of channels 1 and 2 and are not discussed.

Thus, the x and y addresses for each of the channels are generated on a current or running basis providing eight sets of addresses for each scan line with each channel 1 through 8 being addressed at memory 24 and brought out as a complete scan line from memory 24 and formatted in formator or local memory 25 for input as a full scan line into flaw detector 27 in synchronism with the scan data from the flaw data array 13 corrected for misalignment.

The scan line clock rates and pixel line clock rates are determined in accordance with rate at which the check 12 is transported and the relationship between scan line counts and pixel counts. In the practical embodiment of the present invention the ratio between scan line clock rate is selected as one hertz the pixel rate would be 500 hertz.

The actual manner of addressing the memory 24 is not discussed in detail since various schemes for doing so are well known. However, for purposes of completeness a brief description of the manner in which a master check may be stored to make its accessing fairly straightforward is discussed below.

The master check is stored in memory 24 in an arrangement equivalent to the way in which the check 21 is arranged i.e. scan lines and pixels within a scan line. Thus, memory 24 may comprise storage areas which store scan lines each of which corresponds to a scan line on a test check 12. The number of scan lines on a check and, therefore, in storage depends on the width of a check. A check of 2 ½ inch width may have 166 measured at 0.015 inches per scan line. Each scan line comprises 512 pixels.

The memory 24 then would have eight channels with each channel containing portions of 166 scan lines and 64 pixels in the portion of the scan line stored in a particular channel. The eight channels in memory, of course, corresponding to the eight segments of the check in FIG. 4.

Thus, the memory is addressed by eight sets of x and y addresses. For example $x_1$ i.e. scan line 1 and $y_2$ i.e. the pixel number in channel 2 would address scan line 1 and pixel no. 65 in memory. Thus, all the pixels in channel 2 scan line 1 would be read out of memory in synchronism with the flaw data array "seeing" segment 2 all scan line count number 1.

For refinement purposes, the memory 24 may store twice as many scan lines as needed.

The present invention provides a registration system to assure that each scan line of a stored master check is compared with its corresponding scan line on the test check regardless of misalignment of the test check relative to the flaw detection array.

Other modifications of the present invention are possible in the light of the above description which should not be construed as placing limitations on the present invention other than those imposed by the claims which follow.

What is claimed is:

1. A document inspection system for comparing a test document with a master document,
- first means for optically scanning the test document through a plurality of scan lines each of which includes a plurality of picture elements and for converting each scanned line into a stream of bits each representative of a picture element,
- memory means storing the master document according to scan lines and picture elements in a scan line,
- comparison means connected to said first means and said memory means for determining whether the test document passes predetermined quality standards,
- registration means connected to said memory means generating an address for the one of a plurality of segments of each scan line of the test document currently being scanned by said first means.

2. A document inspection system according to claim 1 further including
- transport means disposed adjacent said first means for transporting test documents past said first means.

3. A document inspection system according to claim 2 wherein said first means comprises
- a flaw inspection array disposed adjacent said transport means for viewing each test document as the test document is transported therepast.

4. A document inspection system according to claim 3 wherein said registration means comprises,
- first corner detection means disposed adjacent said transport means for detecting one of the leading corners of the test document,
- second corner detection means disposed adjacent said transport means for detecting the other of the leading corners of the test document.

5. A document inspection system according to claim 4 wherein each of said first and second corner detection means include means for generating a stream of bits representative of black or white areas of the test document.

6. A document inspection system according to claim 5 wherein each of said first second corner detection means includes,
- a scan line clock,
- first counter means connected to said scan line clock responsive to detection of the leading edge of a test document by its respective first or second corner detection means to start counting at the scan line clock rate,
- said first counter means being reset after each test document is completely scanned.

7. A document inspection system according to claim 6 wherein each of said first and second corner detection means includes,
- a pixel clock,
- second counter means, connected to said pixel clock and said scan line clock normally counting at the pixel clock rate responsive to the detection of a horizontal border of the test document by its respective first or second corner detection means to stop counting,
- said second counter means being reset by each scan line clock pulse.

8. A document inspection system according to claim 1 wherein said memory means comprises,
- storage means for storing a master document as a plurality of scan lines and a plurality of bits within each scan line
- each of said scan lines being divided into a plurality of channels equal in number to said plurality of segments such that each channel is addressable by scan line number or x address and a bit number or y address.

9. A document inspection system according to claim 8 wherein said registration means includes means for generating an address to read out from said storage means that portion of a scan line corresponding to the segment of the scan line of the test document currently being scanned by said first means.

10. A document inspection system according to claim 9 wherein the test documents are formatted to have a plurality of scan lines with each scan line including a plurality of pixels.

11. A document inspection system according to claim 10 further including, transport means disposed adjacent said first means for transporting test documents past said first means.

12. A document inspection system according to claim 11 wherein said first means comprises, a flaw inspection array disposed adjacent said transport means for viewing each test document as the test document is transported therepast.

13. A document inspection system according to claim 12 wherein said registration system includes, first corner detection means disposed adjacent said transport means for viewing an area of the test document including one of the leading corners thereof, said first corner detection means including first circuit means providing a first output indicative of the scan line count after a leading vertical edge of the test document is detected and a second output indicative of the pixel count when a horizontal edge of the test document is detected, second corner detection means disposed adjacent said transport means for viewing an area of the test documents including the other of the leading corners thereof said second corner detection means including second circuit means providing a first output indicative of the scan line count after a leading vertical edge of the test document is detected and a second output indicative of the pixel count when a horizontal edge of the test document is detected, third circuit means connected to said first and second corner detection means utilizing the first and second outputs thereof to generate an address for the segments of the scan line of the test document currently being scanned by said flaw inspection array.

14. A document inspection system according to claim 13 wherein said third circuit means comprises, a microprocessor for calculating the starting pixel number for each memory channel, an updating circuit connected to said memory means for each of said memory channels to provide the current channel address for each segment of the test document being scanned in real time.

15. A document inspection system according to claim 14 wherein each of said updating circuits comprises a first adder connected to said microprocessor for receiving the starting pixel number for each channel, a divider circuit, a counter connected between said divider circuit and said first adder, added to the output of said counter for updating the y address for each channel.

16. A document inspection system according to claim 15 wherein each channel further includes, a second adder for algebraically adding a correction factor to the scan line count wherein the correction factor is a function of the difference in scan line line counts between the time said one and said other corners are detected.

17. A system for locating the corners of a document, transport means for transporting the document, a first optical scanning means disposed adjacent said transport means for viewing an area including one leading corner of the document, a second optical scanning means disposed adjacent said transport means for viewing an area including the other leading corner of the document, each of said first and second optical scanning means including means for generating a stream of bits each representative of a black or white area of the document, a scan line clock a pixel clock counting at a rate substantially greater than said scan line clock, each of said optical scanning means including a first counter connected to said scan line clock responsive to detection of the leading edge of the document by its respective optical scanning means to start counting at the scan line clock rate, each of said optical scanning means including a second counter connected to said scan line clock and to said pixel clock normally counting at the pixel clock rate responsive to the detection of a horizontal border by its respective optical scanning means to stop said second counter, said second counter being reset by each scan line clock pulse.

18. A system for generating an address for the one of a plurality of segments of each scan line of a moving document currently being scanned by stationary optical scanning means, comprising in combination;

a first clock having a period equal to the time necessary for a document scan line to pass a fixed point, a second clock having a rate substantially greater than the rate of said first clock means and first optical detection means disposed to view one of the leading corners of the document, second optical detection means disposed to view the other of the leading corners of the document, each of said first and second optical detection means including first counter means connected to said first clock means responsive to detection of the leading edge of the document by its respective first or second optical detection means to start counting at said first clock rate, second counter means connected to said first and second clocks normally counting at said second clock rate responsive to the detection of a horizontal edge of the document by its respective first or second optical detection means to stop counting, said second counter means being reset by each first clock pulse, circuit means connected to each of said first and second counter means to generate an address for the segments of the scan line of the document currently being scanned by the optical scanning means.

19. A system according to claim 18 wherein said circuit means comprises, computer means for calculating the initial pixel number for each segment, an updating circuit for each of said plurality of segments to provide a current address for each segment of the document currently being scanned.

20. A system according to claim 19 wherein each of said updating circuits comprises, a first adder connected to said computer means for receiving the initial pixel number for each segment, a divider circuit connected to said first clock a counter connected between said divider circuit and said first adder, said divider circuit updating said counter by one each time said first clock count equals the number of pixels in a scan line divided by the difference in time measured in said first clock counts between the time said one and said other leading corners of the document are detected whereby the initial pixel number is algebraically added to the output of said counter.

21. A system according to claim 20 wherein each of said updating circuits further includes a second adder for algebraicly adding a correction factor to the first clock count wherein the correction factor is a function of the time difference between detection of said one and said other corners measured in said first clock counts.

* * * * *